United States Patent [19]

Beyers, Jr.

[11] 4,099,372

[45] Jul. 11, 1978

[54] TIMEKEEPING APPARATUS WITH POWER LINE DROPOUT PROVISIONS

[75] Inventor: Billy Wesley Beyers, Jr., Greenfield, Ind.

[73] Assignee: RCA Corporation, New York, N.Y.

[21] Appl. No.: 792,368

[22] Filed: Apr. 29, 1977

[51] Int. Cl.² .......................... G04C 17/00; H02J 9/00

[52] U.S. Cl. .................................... 58/85.5; 58/23 R; 58/152 R; 307/64; 340/663

[58] Field of Search ................ 58/152 R, 152 H, 85.5, 58/152 B, 23 R, 23 BA, 33; 307/64, 66, 130; 340/248 B

[56] References Cited

U.S. PATENT DOCUMENTS

| | | | |
|---|---|---|---|
| 3,608,301 | 9/1971 | Loewengart | 58/152 H |
| 3,626,686 | 12/1971 | Harris | 340/248 B |
| 3,898,644 | 8/1975 | Baxter | 58/152 R |
| 3,922,588 | 11/1975 | Kunzel | 58/23 R |
| 3,955,352 | 5/1976 | Berney | 58/85.5 |

*Primary Examiner*—Robert K. Schaefer
*Assistant Examiner*—William L. Feeney
*Attorney, Agent, or Firm*—Eugene M. Whitacre; Paul J. Rasmussen; Peter M. Emanual

[57] ABSTRACT

In a timekeeping arrangement, including seconds, minutes and hours counters and associated display decoding circuitry, during temporary power line dropouts, the supply voltage for the hours and minutes counters is maintained by an associated voltage storage capacitor so that their contents are retained, and, upon the return of line power, the seconds counter is set to a number corresponding to 30 seconds. In this manner, over a number of random temporary power dropouts, the accuracy of the timekeeping arrangement is maintained without the need of readjustment or the use of auxiliary systems powered by standby power sources.

13 Claims, 6 Drawing Figures

TIMEKEEPING APPARATUS WITH POWER LINE DROPOUT PROVISIONS

BACKGROUND OF THE INVENTION

The present invention relates to the field of digital timekeeping systems with provisions for handling vital information during temporary power dropouts.

Recently, digital timekeeping or clock systems have been developed which count cycles of a reference frequency, e.g., 60 ■, signal to generate binajy signals indicative of time. These timekeeping systems have been employed in combination with such instruments as radio and television receivers and more recently with video tape recording systems to not only display the time but to automatically control the instrument at preset times. Because these timekeeping systems typically derive their power from the same source of power, i.e., the AC line input, as the instrument in which they are included, these timekeeping systems are susceptible to the loss of information during power dropouts.

While some timekeeping systems merely provide a particular type of display after a loss of line power to indicate that the timekeeping function has been interrupted, other systems employ a standby source of power, such as a battery, in conjunction with an auxiliary reference frequency oscillator to continue the timekeeping function during a loss of line power. While the use of a battery as a standby power source may be suitable in some applications, it has many disadvantages in others. Not only are batteries relatively expensive, but their replacement may be an annoying inconvenience to a user. Moreover, in some instruments, like a television receiver, where there may be high voltages stored even during the absence of line power, it may be dangerous for a user to replace an internally located battery without adequate safety provisions which may be relatively expensive. While provisions, like battery chargers, may make the replacement of batteries unnecessary, such provisions also undesirably add cost to an instrument.

In digital equipment, a variety of arrangements are known for storing information during the absence of power. Recently developed nonvolatile semiconductor memories are capable of storing digital information in the complete absence of power, but unfortunately, are relatively expensive. Other digital processing circuits, such as the Texas Instruments TMS 4046 and 4047 RAM (Random Access Memory) integrated circuits include a memory array which is powered separately from the decode, read, write and enable circuitry so that during a standby mode in which main power has been disconnected, a battery may be selectively coupled to only the memory portion to maintain information stored therein for a relatively long period before the battery needs to be replaced or recharged. Unfortunately, such arrangements because of their use of batteries may be undesirable for the reasons set forth above. In other digital processing circuits utilizing relatively low power consumption devices, such as C-MOS (Complementary Metal Oxide Semiconductor) devices, a capacitor may be coupled to the power supply input of the circuits to store sufficient energy to supply power to the circuits during input AC power dropouts. In U.S. Pat. No. 3,982,141 by J. A. Copeland III, there is described a digital processing arrangement including a C-MOS memory and peripheral logic elements in which, during power supply dropouts, the peripheral logic elements are selectively decoupled from the power supply line so that a capacitor coupled to the power supply line through a specially selected resistor may maintain the supply voltage for the C-MOS memory for a relatively long period. Unfortunately, where high density integrated circuits comprising relatively high power consumption devices, such as N-MOS (N channel Metal Oxide Semiconductor), P-MOS (P channel MOS), TTL (Transistor — Transistor Logic) and $I^2L$ (current Injection Logic) devices, are utilized to effect a cost reduction, the size of a capacitor for maintaining supply voltages for even relatively short power dropouts may be unreasonably large.

Moreover, even though it is possible to store vital information in some types of digital processing circuits during a loss of power, vital information in timekeeping systems is not static and requires updating. Therefore, the use of any one of the information storing arrangments described above without more would be undesirable.

SUMMARY OF THE PRESENT INVENTION

A timekeeping apparatus including first counter means for counting first units of time and second counter means for counting at least second units of time, includes means for maintaining power to the second counting means during a temporary loss of input power so that information is retained therein and means for setting the second counter means to a predetermined count corresponding at least approximately to one half the number of first units in one of the second units. In this manner, over a number of random temporary power losses the timekeeping accuracy will be maintained without the need for annoying readjustments or undesirable standy apparatus.

DETAILED DESCRIPTION OF THE EMBODIMENTS OF THE INVENTION

Figure 1:
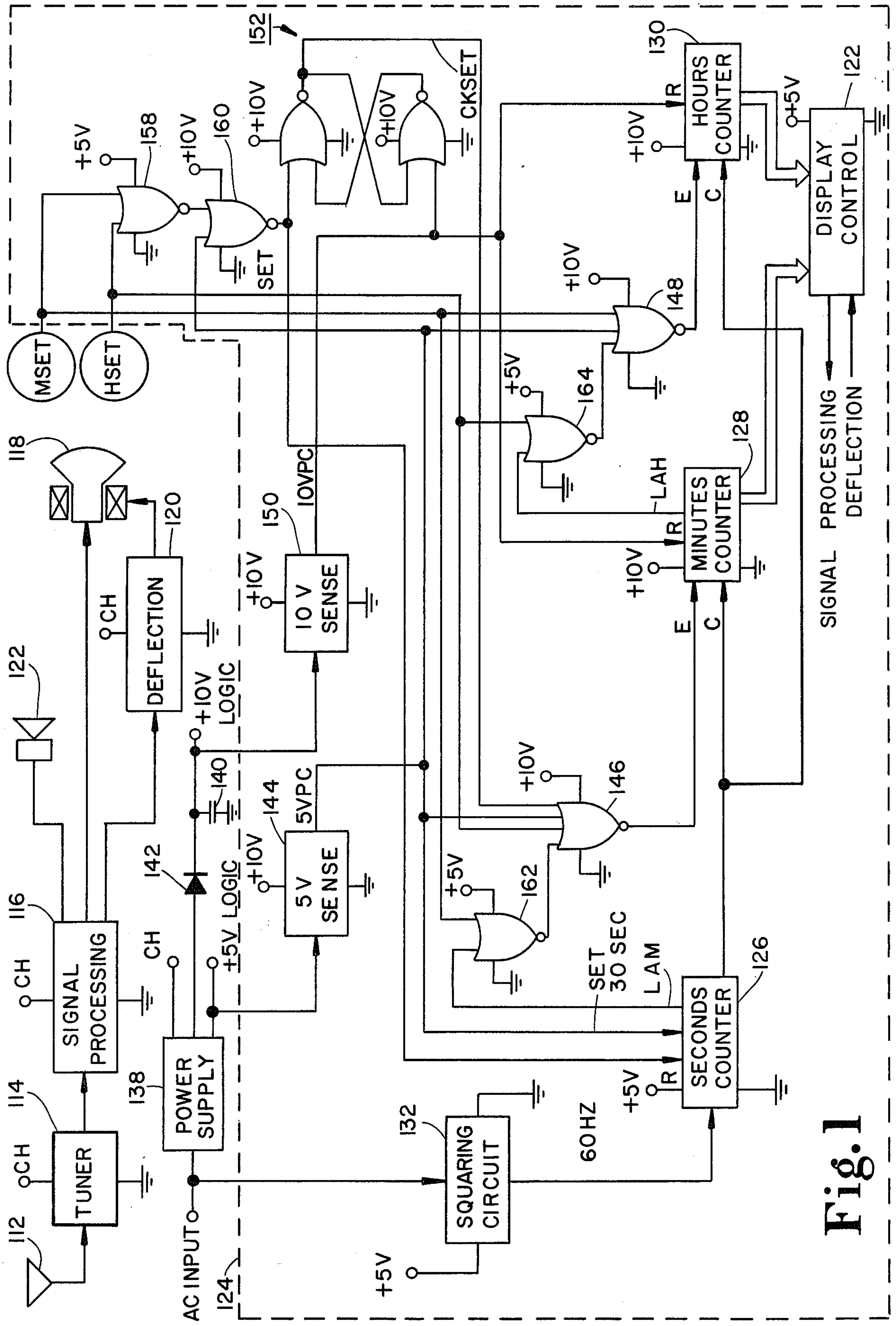
FIG. 1 shows partially in block diagram form and partially in logic diagram form a television receiver employing a timekeeping system with power dropout provisions constructed in accordance with the present invention.

In the television receiver of FIG. 1, radio frequency (RF) signals are received by an antenna 112 and converted to intermediate frequency (IF) signals by a tuner 114. The IF signals are coupled to a signal processing unit 116 which derives signals representing luminance, chrominance, synchronization and sound information. The signals representing luminance and chrominance information are utilized to control the intensity of red, green and blue electron beams generated within a color picture tube 118. The signals representing snychronization information are coupled to a deflection unit 120 which controls the deflection of the electron beams across the screen of picture tube 118 to form an image. The signals representing sound information are coupled to a speaker 122 to provide an audible signal.

An on-screen display unit 122 which may, for example, comprise apparatus similar to that disclosed in U.S. Pat. No. 3,984,828 by B. W. Beyers, Jr., hereby incorporated by reference, is coupled to signal processing unit 116 and deflection unit 120 so that alpha numeric characters are regenerated within a portion of the image to indicate the selected channel and time when certain receiver control functions such as channel selection, color, tint or contrast are initiated by a viewer by means of control apparatus. The control apparatus for the receiver and its interface with display control unit 122, which may, for example, comprise structure similar to that disclosed in the C-9 Service Data for the RCA CTC-74 remote control color television receiver, hereby incorporated by reference, has been omitted from FIG. 1 for the sake of clarity.

In order to derive binary signals representing time information for display control unit 122, a timekeeping system 124 of the receiver, includes a seconds counter 126, a minutes counter 128 and an hours counter 130 to count cycles of a 60 Hz reference signal developed by a squaring circuit 132 from the 60 Hz AC power input. Specifically, seconds counter 126 derives a 2 Hz signal from the 60 Hz reference signal which is selectively enabled to clock minutes counter 128 at predetemined numbers of seconds represented by the generation of an LAM (Look Ahead Minutes) signal and hours counter 130 at predetermined numbers of minutes represented by the generation of an LAH (Look Ahead Hours) signal. In this manner, the contents of the three counters are increased in synchronism with respect to each other to produce binary signals respecting the correct time. In order to save components, for the sake of economy, only the contents of minutes counter 126 and hours counter 128 are coupled to display control unit 122 for display.

Timekeeping system 124 is arranged so that during temporary losses of power or dropouts having relatively short durations, e.g., 2 seconds, occurring in response to transients on the AC power input line due to lightning, switching other appliances on and off and the like, timekeeping accuracy is maintained without readjustment and without the use of relatively expensive standby circuitry including, for example, a battery and an auxiliary oscillator. In order to accomplish this, power supply section 138 of the receiver, in addition to providing supply voltages (symbolically represented as CH for CHassis) for the portions of the receiver earlier described provides separate 5 volt and 10 volt logic supply voltages. Timekeeping system 124 which may desirably comprise a single integrated circuit including the logic components of display control unit 122, has a portion including logic components coupled to a +5 volt supply line and another portion including logic components coupled to a +10 volt supply line having a capacitor 140 coupled in shunt with it. As is shown, the +10 volt supply line is coupled to minutes counter 128 and hours counter 130. During a loss of input AC power to power supply section 138, the +5 volt supply voltage decays relatively quickly and information contained in the portion of timekeeping arrangement 124 coupled to the +5 volt supply line is lost. However, due to storage capacitor 140, the +10 volt supply voltage decays relatively slowly and information contained in minutes counter 128 and hours counter 130 is stored for a time determined by the energy storage characteristics associated with the +10 volt supply line and the minimum supply voltage required to reliably maintain information in counters 128 and 130.

A diode 142 is coupled between capacitor 140 and power supply 138 and poled to be reverse biased during losses of AC line power so that the internal impedances of power supply unit 138 cannot serve as discharge paths for capacitor 140. Furthermore, since only those portions of timekeeping arrangement 124 in which it is desired to maintain vital information draw power from the capacitor 140, its value can be smaller than if information in the entire arrangement were maintained. This permits the use of integrated circuit structures such as N-MOS and P-MOS devices, which although having high power consumption characteristics than C-MOS structures, have higher packaging densities and are therefore less expensive structures than C-MOS structures. While it is possible to utilize two supply voltages of the same value, the use of a +10 volt supply voltage for that portion of timekeeping system 124 in which information is maintained and a +5 volt supply voltage for the remaining portion has a distinct advantage. Since the energy stored in a capacitor is a function of the square of the magnitude of the voltage applied across it, the use of a +10 supply voltage rather than a +5 volt supply voltage significantly increases the information maintenance time. In addition, because the power dissipation of a logic element is inversely related to the magnitude of the supply voltage, the use of a +5 volt supply voltage for the portion of timekeeping arrangement in which vital information is not contained rather than a +10 volt supply for the entire arrangement serves to reduce the arrangement's power consumption under normal operating conditions.

A 5 volt sensing circuit 144 is coupled to the +5 volt supply line to generate a 5 VPC (5 Volt Power Clear) signal when the magnitude of the 5 volt supply voltage is below a predetermined threshold. The 5 VPC signal is coupled to the enable input of minutes counter 128 and hours counter 130 by way of NOR gates 146 and 148 respectively to inhibit their clocking in response to the 2 Hz signal. In this manner, spurious operating conditions which may occur in the 5 volt logic portion when the +5 volt supply voltage is below its predetermined threshold are inhibited from altering the contents of minutes counter 128 and hours counter 130. It will be noted that +5 volt sensing circuit 144 as well as NOR gates 146 and 148 are coupled to the +10 volt supply line rather than the +5 volt supply line to ensure their reliable operation during temporary losses of the +5 volt supply voltage.

To update the time information in timekeeping arrangement 124, the 5 VPC signal is also coupled to seconds counter 126. In response, seconds counter 126 is set to a count corresponding to 30 seconds. If the AC power line dropouts occur at random times, seconds counter 126 will sometimes bet set back in time and sometimes be set ahead in time by up to thirty seconds, depending on the instant count stored in counter 126 when the 5 VPC signal occurs. Therefore, over a number of random AC power line dropouts, the gains and losses of time represented by the contents of seconds counter 126 will have an average which is substantially equal to zero. Therefore, the seconds information is updated without the use of an auxiliary oscillator.

If the power line dropout lasts for a longer time than the voltage maintenance time associated with capacitor 140, the voltage on the +10 volt power supply line may fall below a level below which the logic components coupled to the +10 volt supply voltage line will no longer store information reliably and timekeeping arrangement 124 will no longer be set to the correct time. After AC line power returns, when the voltage on the +10 volt line rises above a predetermined threshold, a 10 volt sense circuit 150 generates a 10 VPC (10 Volt Power Clear) signal. In response to the 10 VPC signal, minutes counter 128 and hours counter 130 are reset to counts of zeros and a S-R FF (Set-Reset Flip-Flop) 152 is set thereby developing a $\overline{\text{CKSET}}$ ("clock not set") signal. The $\overline{\text{CKSET}}$ signal is coupled to NOR gate 146 to disable minutes counter 128 and hours counter 130 from counting. The $\overline{\text{CKSET}}$ signal is also coupled to display control unit 122 so that a predetermined symbol, e.g., a dash, is displayed in the minutes and hours positions to indicate to a user that the timekeeping arrangement 124 is no longer set to the correct time and needs to be readjusted. Until timekeeping arrangement 124 is set, the contents of counters 128 and 130 are maintained at counts of zero.

In order to set timekeeping arrangement 124, a MSET (Minute Set) pushbutton and an HSET (Hour Set) pushbutton are provided. When either pushbutton is depressed, a Set signal is generated by NOR gates 158 and 160 to initially reset seconds counter 126. The SET signal also resets S-R FF 152 causing the termination of the $\overline{\text{CKSET}}$ signal. If MSET pushbutton has been depressed, a count enable signal is coupled through NOR gates 162 and 146 to permit minutes counter 128 to count in response to the 2 Hz signal from seconds counter 126. When the correct time is reached, the MSET is released. When the HSET pushbutton is depressed, a count enable signal is coupled through NOR gates 164 and 148 to permit hours counter 130 to count in response to the 2 Hz signal from seconds counter 126. While one of the counters is enabled to count in response to the depression of a corresponding pushbutton, the other is disabled from counting.

In order that a $\overline{\text{CKSET}}$ is not erroneously generated during a temporary loss of power when only the +5 volt supply voltage has fallen, S-R FF 152 is coupled to the +10 volt supply line rather than the +5 volt supply line. Similarly, so that a SET signal is not erroneously generated during a temporary loss of power, NOR gate 160 is coupled to the +10 volt supply line and is additionally disabled in response to a 5 VPC signal.

Figure 2:
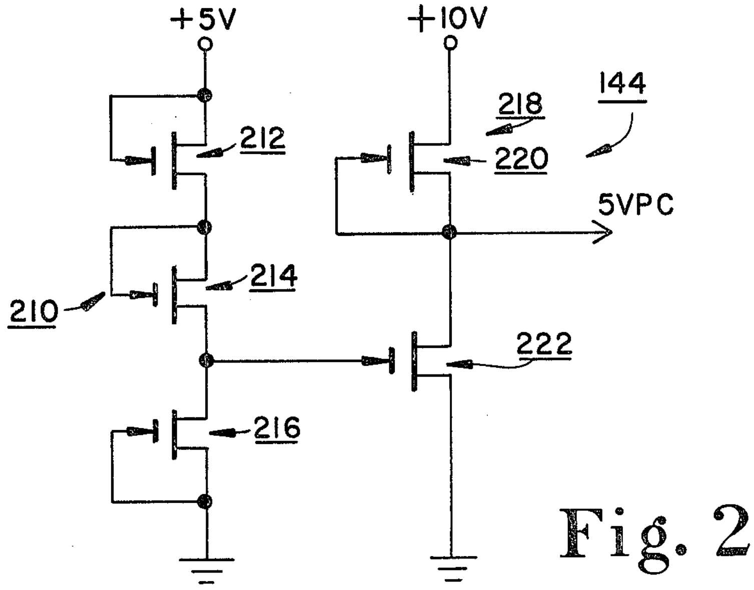
FIGS. 2, 3, 4, 5 and 6 show in schematic and logic diagram form implementations of the timekeeping system of FIG. 1.

In the implementation of 5 volt sense circuit 144 of FIG. 1, shown in FIG. 2, a threshold sensing circuit 210 includes two N-MOS devices 212 and 214, each having their drain and gate electrodes connected, coupled in series between the +5 volt supply line and the drain electrode of an N-MOS device 216. Device 216 is arranged as a resistance element having its gate and source electrodes both connected to ground. The common junction of devices 214 and 216 serves as the output of threshold sensing circuit 210 and is coupled to the input of a logic inverter 218. Inverter 218 comprises an N-MOS device 220 arranged as a resistance element and an N-MOS device 222 arranged in a common source configuration. Inverter 218 is coupled from the +10 volt supply line. As long as the voltage on the +5 volt supply line exceeds the combined gate to source threshold voltages of devices 212 and 214, devices 212 and 214 are conductive and a high logic level, e.g., a voltage in excess of approximately 2.4 volts, is applied to the input inverter 218. When the voltage on the +5 volt supply line falls by an amount in excess of the combined gate to source threshold voltages of devices 212 and 214, devices 212 and 214 are rendered nonconductive thereby applying a low logic level, e.g., a voltage lower than approximately 0.8 volts, to the input of inverter 218. In response to a low logic level input, inverter 218 generates a high logic level as the 5 VPC signal.

Figure 3:
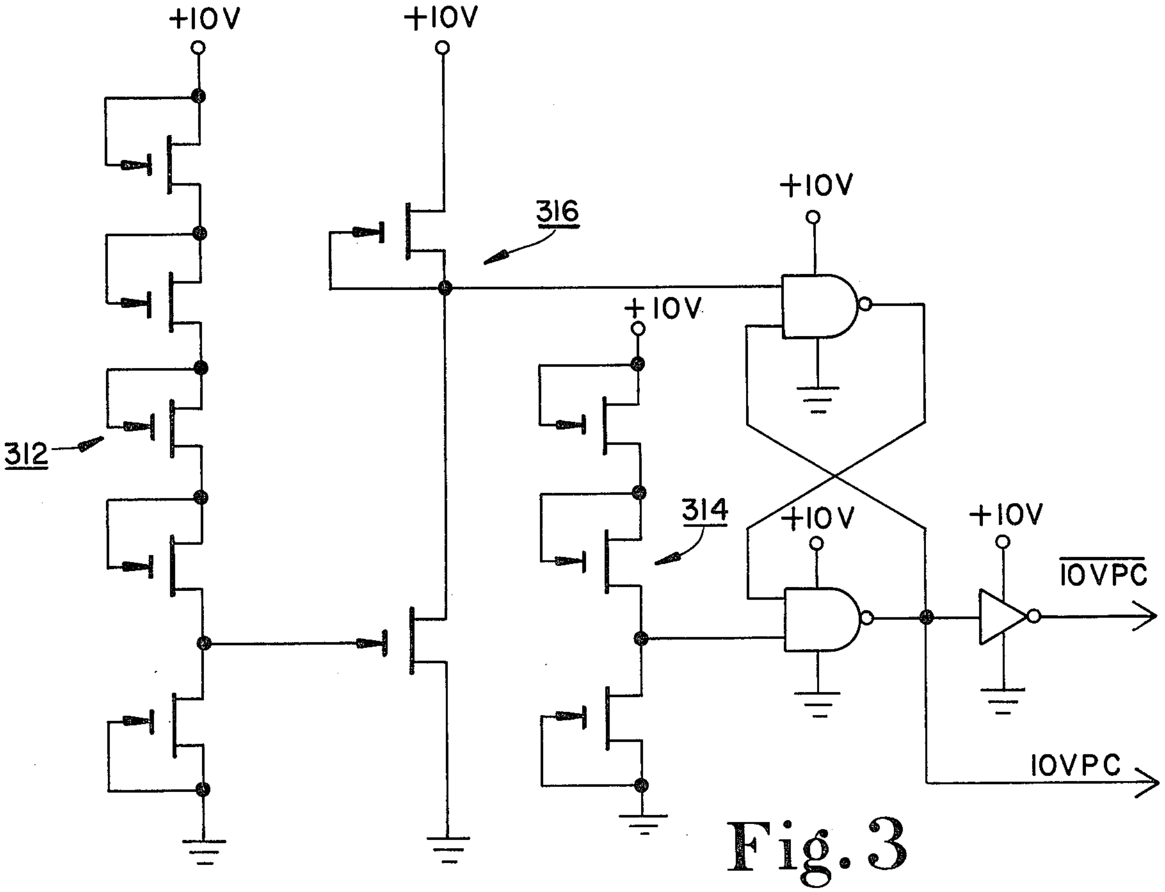

In the implementation of the 10 volt sense circuit 150 of FIG. 1, shown in FIG. 3, threshold sensing circuits 310 and 312 are arranged in a similar manner to that of threshold sensing arrangement 210 of FIG. 2. Threshold sensing arrangement 312 generates a low logic level at its output when the voltage on the +10 volt supply line falls below four gate to source threshold voltages. Threshold sensing arrangement 314 generates a low logic at its output level when the voltage on the +10 volt supply line falls below the gate to source threshold voltages. Thus, for example, arrangement 312 generates a low logic level when the voltage on the +10 volt supply line falls below 8 volts and arrangement 314 generates a low logic level when the voltage on the +10 volt supply line falls below 4 volts. The output of threshold sensing circuit 312 is coupled to an inverter 316 which in turn has its output coupled to one input of an N-MOS S-R FF shown in logic diagram form as comprising NAND gates 320 and 322 for the sake of simplicity. The output of threshold sensing arrangement 314 is coupled to the other input of S-R FF 318.

In operation, assuming the voltage on the 10 volt supply line is +10 volts, a logic high level exists at the output of arrangement 312, a logic low level exists at the output of inverter 316, a logic high level exists at the output of arrangement 314 and a logic low exists at the 10 VPC output of S-R FF 318 taken at the output of NAND gate 322. If the voltage on the +10 volt supply line drops from +10 volts to +6 volts, a logic low level will be developed at the output of threshold sensing circuit 312 and accordingly a logic high level will be developed at the output of inverter 316. However, a logic high level will continue to exist at the output of threshold sensing circuit 314. As a result, the 10 VPC output will remain a low logic level. If the voltage on the +10 volt supply line drops below 4 volts, a low logic level will be developed at the output of threshold sensing circuit 314 and as a result a high logic level will be developed at the 10 VPC output of S-R FF 318. In summary, during power dropouts a high 10 VPC signal, with the resulting sequence of operation for loss of the voltages on both the +5 and +10 volt supply line drops to 4 volts. This is desirable since information will be maintained in N-MOS logic circuitry at relatively low supply voltage, e.g., 4 volts.

After a loss of input power in which the voltage on the 10 volt supply line has fallen below +4 volts, when input power returns, threshold sensing circuit 314 will produce a high logic level prior to threshold sensing circuit 312 and as a result, S-R FF 318 will initially generate a high 10 VPC signal. The 10 VPC signal will not become a low logic level permitting the readjustment of timekeeping arrangement 124 of FIG. 1 until the voltage on the 10 volt supply line exceeds 8 volts. This is desirable because although information may reliably be stored in N-MOS logic elements at relatively low supply voltages, during dynamic switching operations it is desirable that N-MOS logic elements be provided with higher than information maintenance supply voltages to obtain the most reliable performance. An N-MOS inverter 324 shown in logic diagrm is coupled to the output of NAND gate 322 to provide the logic complement of the 10 VPC signal for use in the implementation of hours counter 130 shown in FIG. 6.

Figure 4:
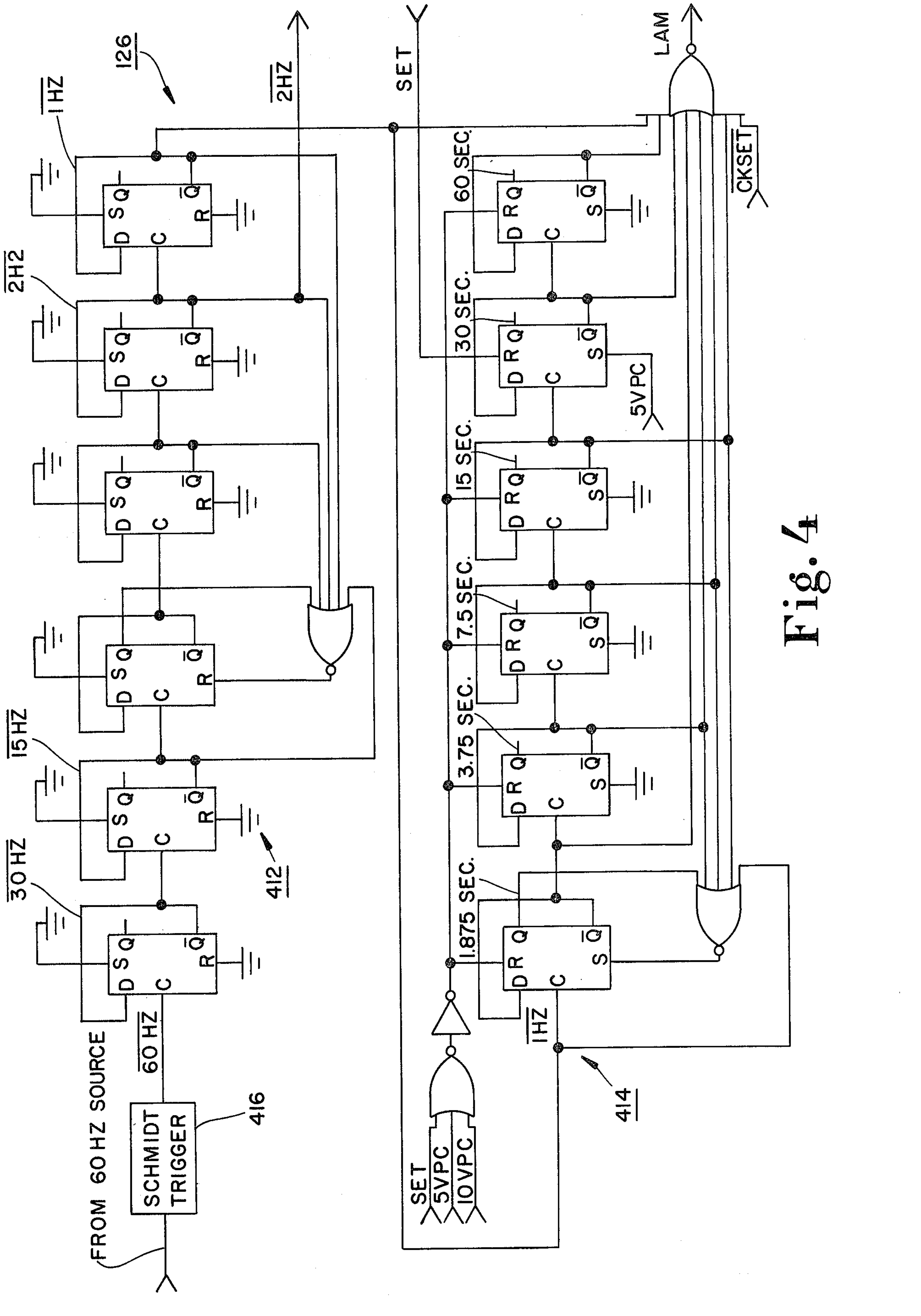
Figure 5:
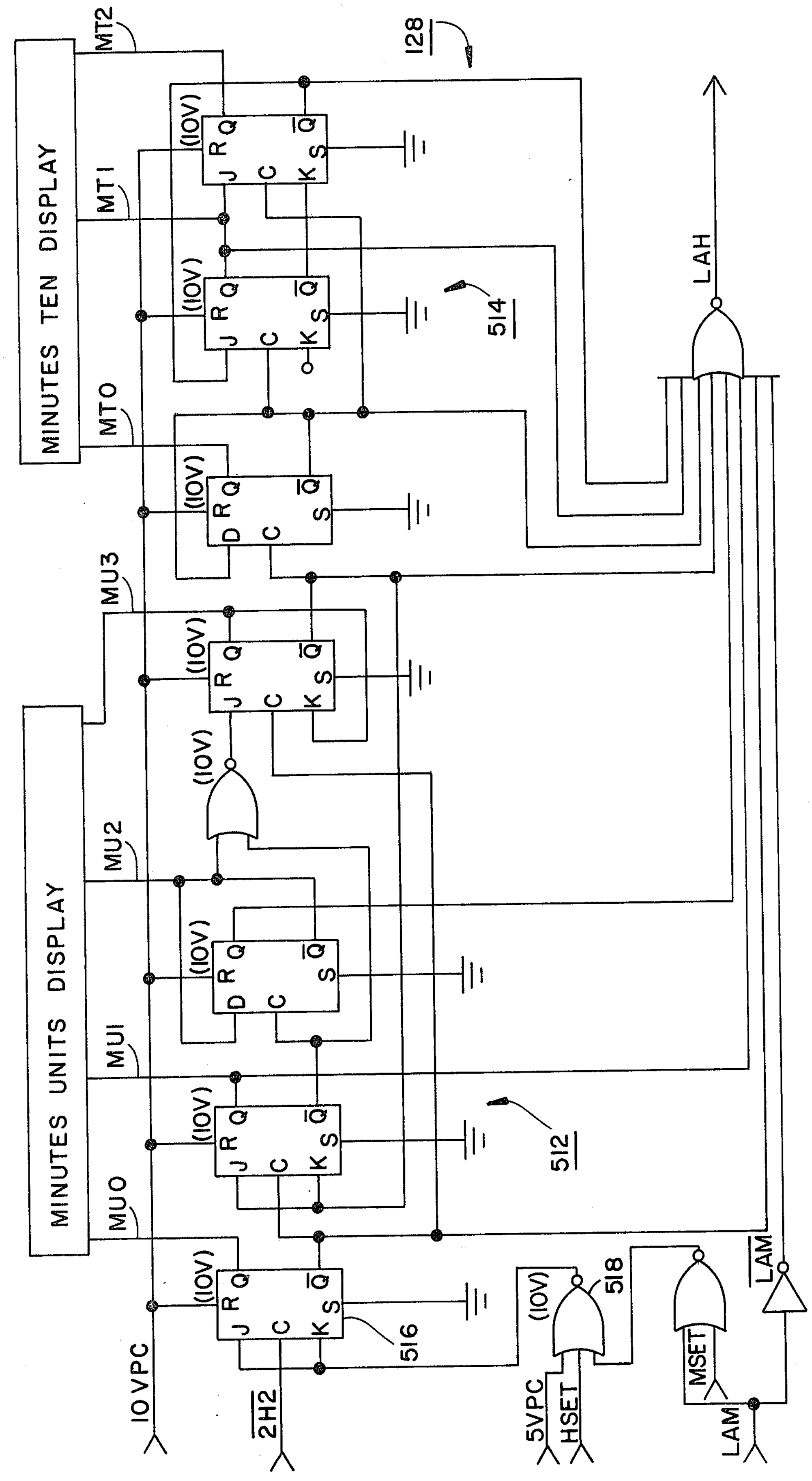
Figure 6:
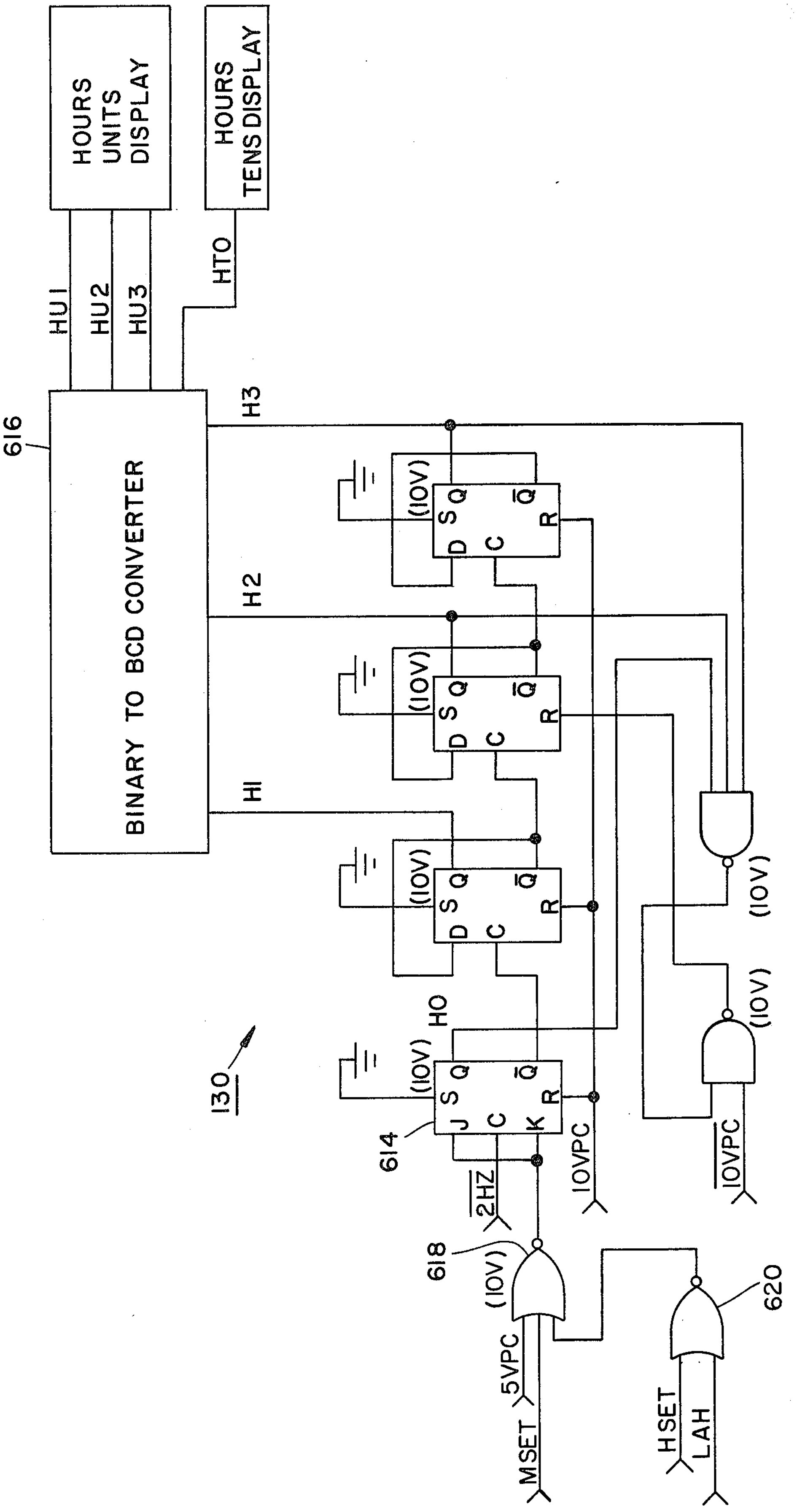

A description of the functional operation of the logic implementations of counters 126, 128 and 130 utilizing conventional logic elements shown in FIGS. 4, 5 and 6 will be apparent to those skilled in the art by reference to the functional description of the generation and utilization of the signals already described with reference to FIG. 1 and therefore will not be repeated for the sake of brevity. In FIGS. 4, 5 and 6 those logic elements provided with power from the +10 volt supply line are indicated by the symbol (10 V). The remaining elements are provided with power from the +5 volt supply line.

The logic implementation of seconds counter 126 of FIG. 1 shown in FIG. 4 includes two cascaded ripple counters 412 and 414, each comprising a group of cascaded S-R D FFs (Set-Reset Data Flip-Flops) and a NOR gate to feed back binary signals at predetermined counts as indicated. Counter 412 counts fractions of seconds in response to a 60 Hz reference signal generated by a Schmidt trigger circuit 416. Counter 414 counts whole seconds in response to a 1 Hz signal generated by the last FF in counter 412.

The logic implementation of minutes counter 128 of FIG. 1 shown in FIG. 5 includes a ripple counter 512 comprising S-R D and J-K FFs arranged to generate BCD output signals, MU0, MU1, MU2 and MU3 for the units position of the minutes display followed in cascade by another ripple counter 514 comprising S-R D and J-K FFs to generate BCD signals MT0, MT1 and MT2 for the tens position of the minutes display. The 2 Hz clocking input signal is inhbiited from clocking counters 512 and 514 by the simultaneous application of a low logic level to the J and K inputs of the first J-K FF 516 of minutes counter 128 in response to the application of at least one high logic level to a NOR gate 518. As is indicated, NOR gate 518 is responsive to the signals 5 VPC, HSET and $\overline{MSET} \cdot \overline{LAM}$ (the symbol · representing the AND Boolean function). So that NOR gate 518 reliably inhibits the contents of minutes counter 128 from being altered due to the erratic operating conditions of seconds counter 126 during temporary losses of power, NOR gate 518 is coupled to the +10 volt supply line so that it may reliably respond to a 5 VPC signal. Furthemore, referring briefly back to FIG. 4, it is seen that the generation of a LAM signal is inhibited in response to a $\overline{CKSET}$ signal.

The logic implementation of hours counter 130 of FIG. 1 shown in FIG. 6 comprises a S-R J-K FF 614 followed in cascade by a group of S-R D FFs to form a ripple counter arranged to generate binary signals H0, H1, H2 and H3 representing, in straight binary format, the hours 0 through 12. Since binary output signals H0, H1, H2 and H3 of counter 612 are in straight binary rather than BCD format, they are converted by a combinational network 616 to signals HU1, HU2, and HT0 representing in BCD format the units and tens information for the hours display. To inhibit spurious signals on the 2 Hz clock input line from erroneously altering the contents of counter 612 during temporary power dropouts, an inhibiting low logic level is simultaneously coupled to the J and K inputs of FF 614 from a NOR gate 618 in response to a 5 VPC signal. To ensure the reliable operation of NOR gate 618 during a temporary power dropout, NOR gate 618 is also coupled from the +10 volt logic supply line. Furthermore, NOR gate 618 inhibits hours counter 130 from counting in response to a MSET signal, in the absence of an LAH synchronization signal from the minutes counter by virtue of the operation of a NOR gate 620. Since the LAH depends on the generation of an LAM signal (see FIG. 5), which in turn depends on the generation of a $\overline{CKSET}$ signal (see FIG. 4), hours counter 130 is inhibited from counting up from zero until a user initiates the time readjustment operation by depressing the MSET pushbutton ,thereby resetting the $\overline{CKSET}$ signal.

The logic implementations shown in FIGS. 2–6 may desirably be constructed on a single N-MOS or P-MOS integrated circuit. Since N-MOS, P-MOS devices can be formed to operate over a wide range of supply voltage, both 5 volt and 10 volt devices as indicated in FIGS. 2–6 may be readily formed on the same substrate. Furthermore, because N-MOS and P-MOS devices have high input impedances, high logic levels of a 10 volt device will not adversely affect the operation of a 5 volt device which follows. Although an $I^2L$ integrated circuit may also be employed, for the reasons just stated, an N-MOS or P-MOS integrated circuit may be more desirable than an $I^2L$ integrated circuit. As earlier mentioned, N-MOS, P-MOS and $I^2L$ integrated circuits have high densities and are therefore less expensive than C-MOS integrated circuits. However, a C-MOS integrated circuit may be desirable where power consumption rather than cost is a prime factor.

What is claimed is:

1. A timekeeping apparatus comprising:

a source of reference frequency signal;

first counting means responsive to said reference frequency signal for generating a first group of binary signals representing first units of time;

second counting means responsive to signals of said first group for generating at least a second group of binary signals representing at least second units of time;

a source of input power;

power supply means for developing power for said first and second counting means from said input power;

power maintenance means for maintaining power to said second counting means during a loss of said input power so that information is retained in said second counting means for at least a predetermined time interval;

means for setting said first counting means to a predetermined count corresponding at least approximately to one-half the number of said first units of time in one of said second units after a temporary loss of power having a duration less than said predetermined time interval so that over a number of temporary losses of power the count accumulated in said first counter means will at least approximately correspond to the correct time.

2. The timekeeping apparatus recited in claim 1 wherein said first counting means counts in units of seconds and said second counting means counts in units of minutes and hours.

3. The timekeeping apparatus recited in claim 2 wherein said predetermined count corresponds at least approximately to 30 seconds.

4. The timekeeping apparatus recited in claim 2 wherein said power maintenance means comprises capacitive voltage storage means.

5. The timekeeping apparatus recited in claim 2 wherein said power maintenance means is coupled to power said second counting means exclusively of said second counting means during said temporary loss of input power so as to increase said predetermined time interval.

6. The apparatus recited in claim 5 wherein said second counting means includes disabling means for inhibiting the contents of said second counting means from being altered in response to operating conditions of said first counting means during said temporary loss of input power.

7. The apparatus recited in claim 6 wherein said power supply means includes first supply voltage means for developing a first supply voltage from said input power for said first counting means; second supply voltage means for developing a second supply voltage from said input power for said second counting means; and capacitive means coupled to said second supply voltage means for maintaining the magnitude of said second supply voltage above a predetermined information maintenance threshold supply voltage so that the contents of said second counter means are stored for at least said predetermined time interval.

8. The timekeeping apparatus recited in claim 7 wherein said first supply voltage developed by said first supply voltage means has a relatively small magnitude so as to minimize a power consumption by said first counting means; and said second supply voltage developed by said second supply voltage means has a relatively large magnitude so as to maximize the time the magnitude of said second supply voltage is maintained above said predetermined information maintenance threshold.

9. The timekeeping apparatus recited in claim 8 wherein said power maintenance means includes first voltage sensing means for generating a first power clear signal when the magnitude of said first supply voltage falls below a first predetermined threshold; said first counting means is set to said predetermined count in response to said first power clear signal; and said second counting means is disabled from counting in response to signals developed by said first counting means in response to said first power clear signal.

10. The timekeeping apparatus recited in claim 9 wherein said first voltage sensing means is supplied with power from said second supply voltage means.

11. The timekeeping apparatus recited in claim 10 wherein said power maintenance means includes second means for generating a second power clear signal when the magnitude of said second supply voltage falls below a second predetermined level and for terminating said second power clear signal when the magnitude of said second supply voltage rises above a third predetermined level greater than said second predetermined level; and wherein said timekeeping apparatus further includes means for generating a "clock not set" signal representing that the time represented by the contents of said first and second counting means is in error in response to said second power clear signal; means for manually setting said first and second counting means; and means for resetting said "clock not set" signal when said contents of at least one of said first and second counting means have been manually set.

12. The apparatus recited in claim 11 wherein said second counting means includes respective minutes and hours display means being supplied from said first supply voltage means.

13. The timekeeping apparatus recited in claim 12 wherein said minutes and hours display means include means to display a predetermined signal in response to said "clock not set" signal.

* * * * *

UNITED STATES PATENT OFFICE
CERTIFICATE OF CORRECTION

PATENT NO. : 4,099,372

DATED : July 11, 1978

INVENTOR(S) : Billy Wesley Beyers, Jr.

It is certified that error appears in the above-identified patent and that said Letters Patent are hereby corrected as shown below:

Column 1, line 11, that portion reading "60■" should read -- 60 Hz --; line 11, that portion reading "binajy" should read -- binary --; Column 7, line 48, that portion reading "HU2, and HT0" should read -- HU2, HU3, and HT0--.

Signed and Sealed this

*Fifth* Day of *December 1978*

[SEAL]

*Attest:*

RUTH C. MASON
*Attesting Officer*

DONALD W. BANNER
*Commissioner of Patents and Trademarks*